(12) United States Patent
Norton

(10) Patent No.: US 8,794,418 B1
(45) Date of Patent: Aug. 5, 2014

(54) BALL LOCK COMPENSATOR FOR USE WITH A ROBOTIC TOOL

(71) Applicant: ATI Industrial Automation, Inc., Apex, NC (US)

(72) Inventor: Daniel Allen Norton, Cary, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 0 days.

(21) Appl. No.: 13/828,589

(22) Filed: Mar. 14, 2013

(51) Int. Cl.
*B25J 17/02* (2006.01)
*B25G 3/18* (2006.01)
*F16D 43/02* (2006.01)

(52) U.S. Cl.
USPC ............. 192/150; 74/490.06; 901/29; 901/45

(58) Field of Classification Search
None
See application file for complete search history.

(56) References Cited

U.S. PATENT DOCUMENTS

| | | | |
|---|---|---|---|
| 4,242,017 A | | 12/1980 | De Fazio |
| 4,311,224 A | * | 1/1982 | Kato et al. .................... 192/56.5 |
| 4,458,424 A | | 7/1984 | Cutkosky et al. |
| 4,537,557 A | | 8/1985 | Whitney |
| 4,636,135 A | | 1/1987 | Bancon |
| 4,639,184 A | * | 1/1987 | Knasel et al. ................. 414/730 |
| 4,679,956 A | | 7/1987 | Douglas et al. |
| 4,696,524 A | | 9/1987 | Cloyd |
| 4,741,642 A | * | 5/1988 | Carlton ............................ 403/59 |
| 4,759,686 A | | 7/1988 | Kirst |
| 4,815,780 A | | 3/1989 | Obrist |
| 4,906,123 A | | 3/1990 | Weskamp et al. |
| 4,998,606 A | * | 3/1991 | McCormick et al. ....... 192/56.32 |
| 5,211,501 A | | 5/1993 | Nakamura et al. |
| 5,909,941 A | | 6/1999 | Cheng et al. |
| 5,918,870 A | | 7/1999 | Stark |
| 6,069,415 A | * | 5/2000 | Little et al. ..................... 307/326 |
| 6,375,378 B1 | | 4/2002 | Kitaura |
| 6,398,279 B1 | | 6/2002 | Kikut |
| 6,690,208 B2 | | 2/2004 | Gloden et al. |
| 7,422,075 B2 | * | 9/2008 | Hahn ............................. 173/178 |
| 2002/0067045 A1 | | 6/2002 | Blanchard |
| 2007/0231063 A1 | | 10/2007 | Tsutsumi et al. |

FOREIGN PATENT DOCUMENTS

| | | |
|---|---|---|
| GB | 2262502 A | 6/1993 |
| JP | 8052682 A | 2/1996 |
| JP | 11114870 A | 4/1999 |

OTHER PUBLICATIONS

U.S. Appl. No. 13/828,779.

* cited by examiner

*Primary Examiner* — Gene Crawford
*Assistant Examiner* — Mark Manley
(74) *Attorney, Agent, or Firm* — Coats & Bennett, P.L.L.C.

(57) ABSTRACT

A compensation device that is positioned between a robot and a robotic tool. The device 10 generally includes a first section that connects to the robot and a second section that connects to the tool. The second section is movable relative to the first section for the tool to comply to accommodate variations in its positioning. The second section 12 may comply rotationally about x, y, and z orthogonal axes relative to the first section.

19 Claims, 9 Drawing Sheets

BALL LOCK COMPENSATOR FOR USE WITH A ROBOTIC TOOL

BACKGROUND

The present application is directed to the field of robotics and, more specifically, to a compensation device positioned between a robot and a robotic tool.

Robots are widely utilized in industrial assembly line applications to perform repetitive tasks very precisely without the need for human operation, interaction, or supervision. For example, robots are commonly used in the automotive industry to perform a number of tasks such as material handling and spot-welding of automobile bodies. To amortize the considerable cost of an industrial robot over a variety of tasks, the robot arm is typically separate from a diverse array of tools, which are removably attached to the end of the robot arm.

The robotic tool may encounter obstacles as it performs its various functions. To accommodate a variety of applications, the robotic tool may be designed to "give" or flex, thus providing the tool with a limited amount of freedom of movement when it encounters an obstacle or exerts a torque. This flexibility is referred to as "compliance." The amount of compliance may vary depending upon the context of use, the robot, and/or the robotic tool.

Because an obstacle can exert different forces on the robotic tool depending upon where the two come into contact, it is desirable for the robotic tool to provide compliance in several directions (e.g., in the x, y, and z directions). Additionally, because the environments in which robots are used are sometimes hostile and unsafe for humans, it is also desirable for the robotic tool to be capable of automatically returning to its original home position, or "resetting," when the overload condition no longer exists, without the need for human intervention. Thus, it is desirable for the system to be capable of resetting itself, regardless of whether the overload condition was due to linear or rotational movement.

SUMMARY

The present application is directed to a compensation device configured to be positioned between a robot and a robotic tool. The compensation device provides for rotational compliance along one or more axes.

One embodiment is directed to a compensation device that includes a first section configured to be mounted to the robot and comprising a cavity formed between a bottom wall and a side wall and including an open top with the cavity extending along a first axis. A second section is configured to be operatively connected to the robotic tool. The second section includes an elongated member with a first end and a second end with the first end positioned in the cavity and in contact with and forming a pivot bearing and the first section with the second end extending outward beyond the top of the cavity. The second section also includes a tool plate spaced along the elongated member and away from the first end, and a radial member positioned along the elongated member between the first end and the tool plate and being located within the cavity with the radial member including a plurality of seats positioned around the periphery and facing radially outward towards the side wall of the cavity. The device also includes a piston positioned in the first section and being axially movable along the first axis with the piston including a contact surface that faces radially inward towards the seats. The device also includes ball members positioned between the radial member and the piston with one of the ball members positioned in each of the seats. The device is configured such that the piston is biased away from the bottom wall and towards the tool plate to contact the ball members and apply a radial force around the elongated member to bias the elongated member to be aligned along the first axis.

The second section may be movable relative to the first section to comply rotationally about the first axis, and about second and third axes with the axes being orthogonal.

The device may also include springs positioned between the first section and the piston to bias the piston away from the bottom wall and towards the tool plate. The piston may include an annular shape and may be positioned along an outer periphery of the side wall of the cavity. The contact surface of the piston may be positioned at an acute angle with the first axis.

The device may be configured such that pivoting movement of the second section away from the first axis may drive at least one of the ball members radially outward from the first axis and may force the piston downward within the first section. The piston may include a second contact surface adjacent to the contact surface that is positioned at a second acute angle with the first axis that is greater than the acute angle with at least one of the ball members contacting against the second contact surface during movement of the second section away from the first axis.

The first end of the elongated member may include a spherical head that remains in contact with the bottom support during movement of the second section relative to the first section.

The side wall of the cavity may include openings that are spaced apart with each of the openings receiving one of the plurality of ball members with the ball members extending through the openings when the second section is aligned along the first axis.

Another embodiment is directed to a compensation device adapted to be interposed between a robot and a robotic tool. The compensation device includes a first section with a cavity formed by a bottom wall and a side wall. The device also includes a second section movably positioned in the cavity and including a first end with a head pivotally positioned against the first section, a tool plate spaced away from the head, and an intermediate member positioned between the head and the tool plate with the head and the intermediate member positioned in the cavity and the tool plate positioned outward from the cavity. The device also includes a piston positioned in the first section and being movable axially along an axis of the cavity. The device includes ball members positioned between the piston and the intermediate member and being radially movable relative to the axis of the cavity. The piston is biased away from the bottom wall of the first section to contact the ball members and apply a radial force through the ball members around the intermediate member to position the second section at a home position. The second section is pivotable away from the home position upon the application of an external force to the tool plate such that at least one of the ball members moves radially outward away from the axis of the cavity and the piston moves along the axis of the cavity with the head of the second section remaining in contact with the first section.

The second section may be pivotable about the axis of the cavity with the first and second members being configured for the ball members to remain at the same axial position along the cavity.

The device may also include a channel that extends through a pivot bearing formed between the first member and the head of the second member to allow the passage of electrical cables, air lines, or other utilities.

The intermediate member may include radially open seats each sized to receive one of the ball members. Each of the seats may include a back wall with a first curvature and opposing side walls with a second curvature such that the ball members contact the seats at the intersections of the back wall and the side walls at the home position.

The side wall of the cavity may include openings that are spaced apart with each of the openings receiving one of the ball members. The openings may be sized such that a portion of the ball members extend through the openings in the home position.

The piston may include an annular shape and extend radially around an exterior of the side wall of the cavity.

The device may also include a sensor mounted to the first section to detect when the second section is at the home position.

Another embodiment is directed to a compensation device adapted to be interposed between a robot and a robotic tool. The compensation device includes a housing with a first side and an opposing second side and having a central axis that extends through the first and second sides. The device includes a cage that extends from the housing and is non-movable relative to the housing with the cage including a receptacle that is aligned with the central axis. The device also includes a cam member movably mounted to the base with the cam member including: a plate positioned at the first side of the base and outward beyond the cage; a pivot cam positioned within the cage and having a central section with a plurality of seats that open radially outward towards the cage; and a head positioned on an opposing side of the pivot cam from the plate with the head having a spherical section that contacts against the housing. The device also includes ball members mounted between the cage and the pivot cam with one of the ball members positioned within each of the seats. The device includes a piston that is movable along the central axis and is biased into contact with the ball members to force the ball members radially against the pivot cam. The cam member is biased toward a first position aligned along the central axis by the radial force applied around the pivot cam. The cam member is pivotable relative to the housing and the cage about the central axis. The cam member is pivotable relative to the housing and the cage to move the plate away from the central axis with the head remaining in contact with the housing during the pivoting movement.

The piston may include an annular shape with a central opening, the piston extending around an exterior of the cage.

A channel may through a pivot bearing formed between the head and the housing.

The various aspects of the various embodiments may be used alone or in any combination, as is desired.

DETAILED DESCRIPTION

The present application is directed to compensation device that is positioned between a robot and a robotic tool. The device allows for the tool to comply rotationally about multiple different axes to accommodate forces that are applied to the tool. The device may be further configured to return the tool to an original or home position when the one or more forces are removed from the tool.

Figure 1:
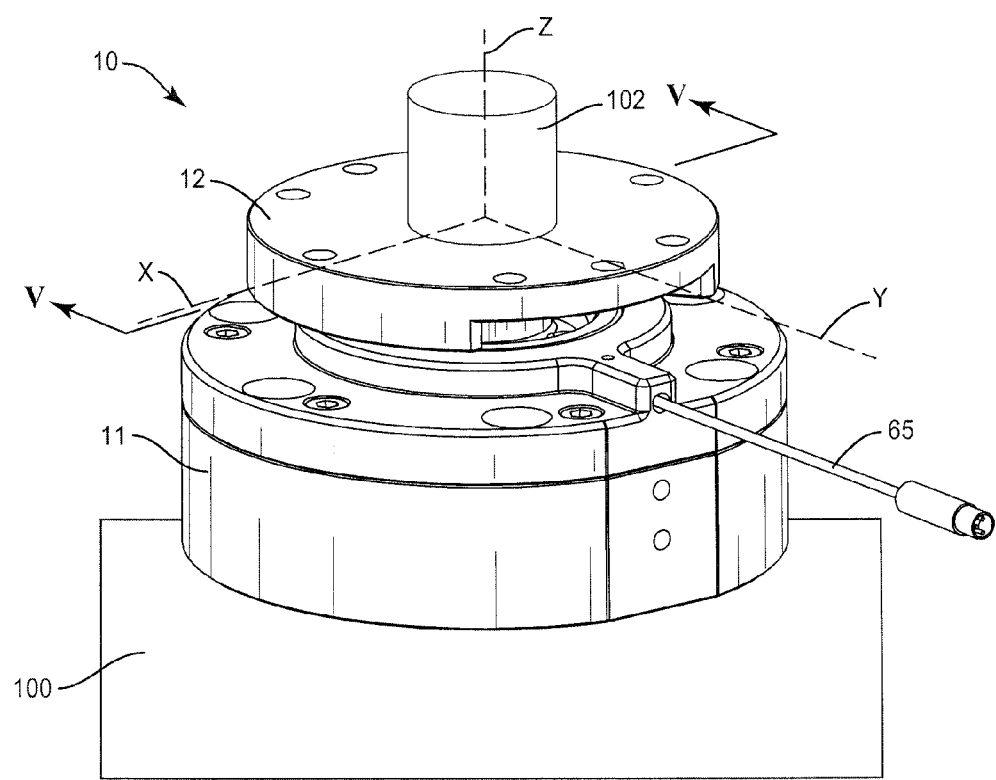
FIG. 1 is a perspective view of a compensation device positioned between a robot and a robotic tool.

FIG. 1 illustrates a compensation device 10 that is positioned between a robot 100 and a robotic tool 102. The device 10 may be configured to connect directly to the tool 102. Alternatively, the device 10 may be configured to connect to one or more intermediate members which are connected to the tool (i.e., the device is indirectly connected to the tool 102). The robot 100 may comprise a variety of different configurations, with one embodiment including a robotic arm that is movable in multiple directions for moving the tool 102 to various locations within a work area.

The device 10 generally includes a first section 11 that connects to the robot 100 and a second section 12 that connects to the tool 102. The second section 12 is movable relative to the first section 11 for the tool 102 to comply to accommodate variations in its positioning. As illustrated in FIG. 1, the second section 12 can comply rotationally about x, y, and z orthogonal axes relative to the first section 11.

For purposes of this application, the device 10 will be described in the orientation illustrated in FIG. 1. This will include the first section 11 being relatively lower than or below the second section 12 along the z axis. This orientation is for ease of description in discussing the relative positioning of the various elements of the device 10. It is understood that the device 10 will be placed in a variety of orientations in which the elements 11, 12 are positioned at different relative orientations.

Figure 2:
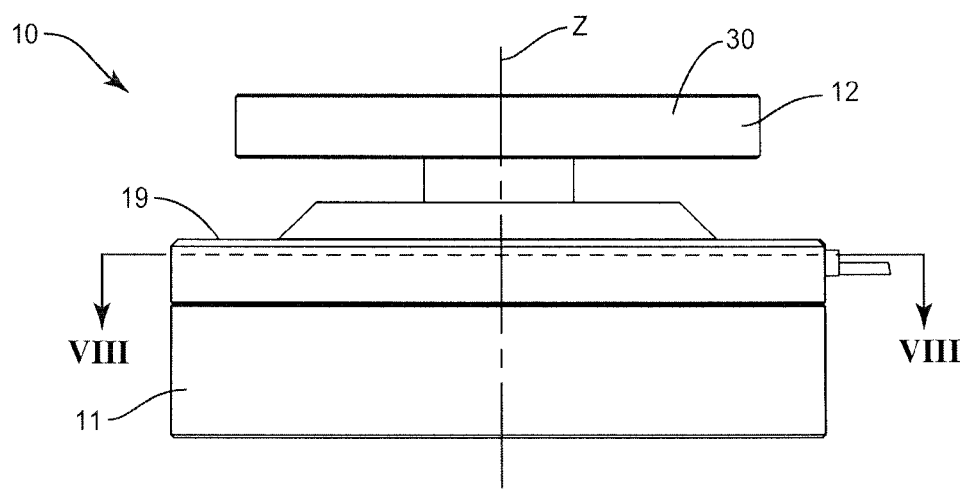
FIG. 2 is a side view of a compensation device in a home position.

FIGS. 1 and 2 each illustrate the device 10 in an original or home position. The device 10 may be configured to assume this position when no external forces are acting upon it. Each of the first and second sections 11, 12 are aligned along the z axis. In one embodiment, the second section 12 includes a tool plate 30 that is evenly spaced away from the first section 11 in the home position. In one embodiment, the tool plate 30 includes a top side that is parallel with a top side 19 of the first section 11 in the home position.

Figure 3:
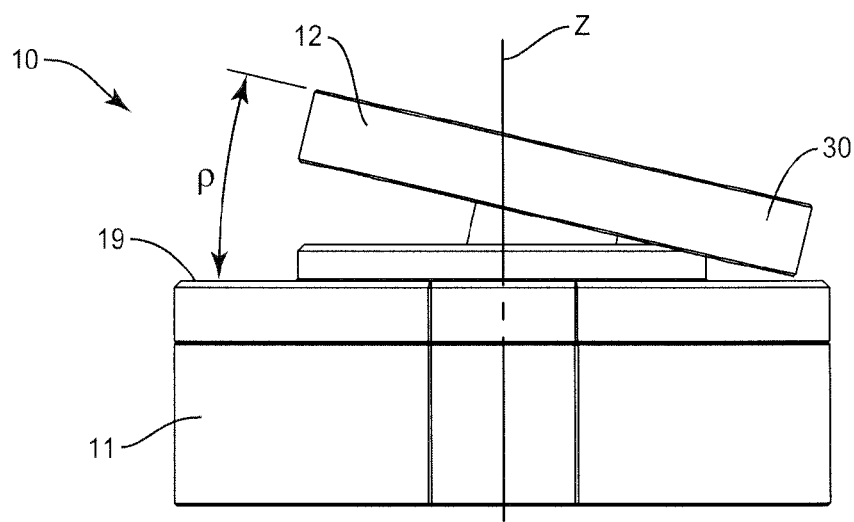
FIG. 3 is a side view of a compensation device titled about one or more axes.

FIG. 3 illustrates the device 10 in a tilted orientation in which the second section 12 is rotated about one or both of the x and y axes. The extent of compliance is illustrated by angle ρ formed between the top side of the tool plate 30 and the top side 19 of the first section 11. The extent of compliance may vary, with one specific embodiment including the angle ρ being about 13°. The tool plate 30 may or may not contact the top side 19 of the first section 11 when positioned at maximum compliance. Likewise, the device 10 is able to compensate for forces that cause movement about the z axis. In one embodiment, the second section 12 is able to rotate about 18° in each of first and second directions about the z axis.

The device 10 is configured to simultaneously comply about the x, y, and z axes. In one embodiment, the device 10 is configured to prevent the second section 12 from moving laterally (e.g., in the x-y plane) relative to the first section 11 during the rotational movement. In one embodiment, the amount of force required to rotate the second section 12 relative to the first section 11 is the same for each axes x, y, z.

Figure 4:
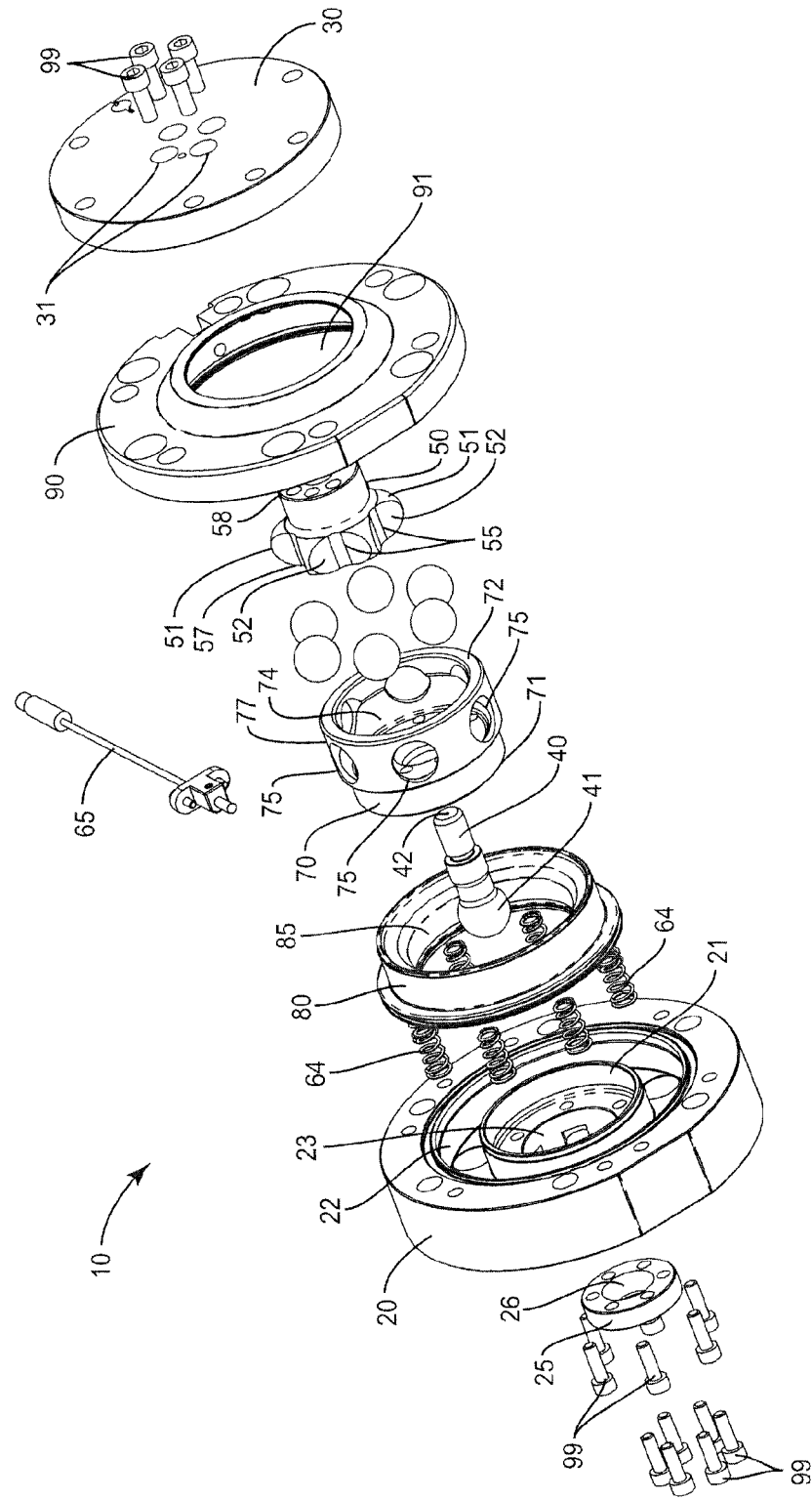
FIG. 4 is an exploded perspective view of a device.
Figure 5:
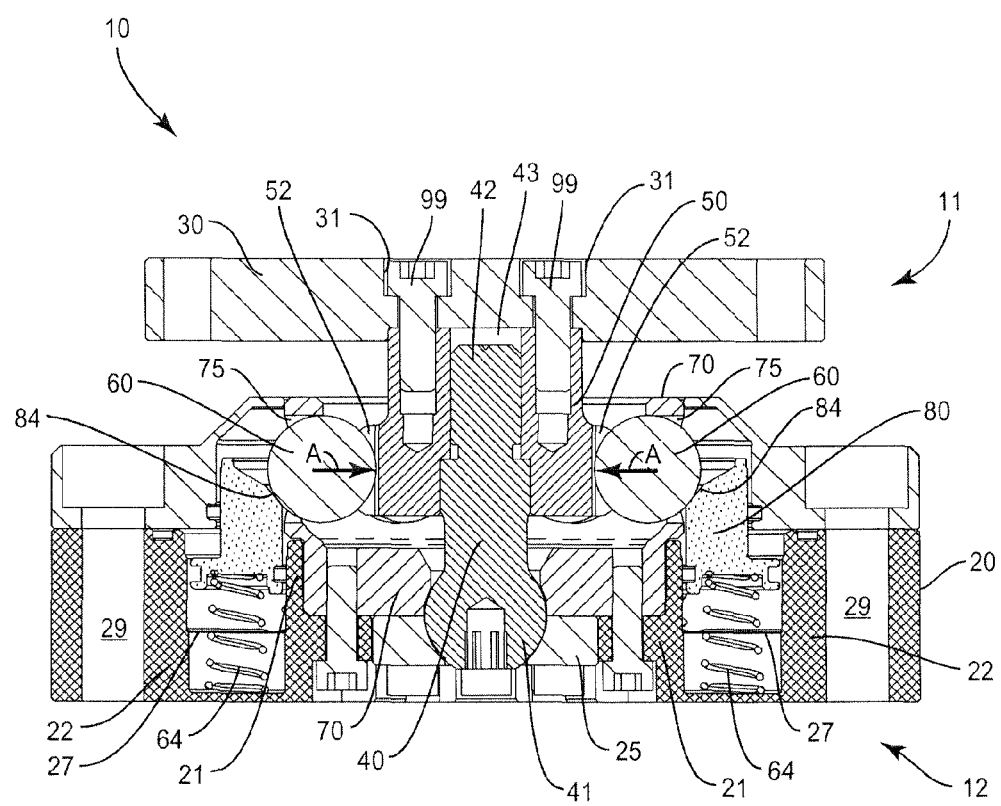
FIG. 5 is a side sectional view of the device of FIG. 1 cut along line V-V.

The various elements of the device 10 are illustrated in FIGS. 4 and 5. FIG. 4 includes an exploded view, and FIG. 5 is a cross sectional view of the device 10 in the home position. The first section 11 includes a housing 20 and a ball cage 70, and the second section 12 includes the tool plate 30, a pivot cam 50, and a ball pivot 40. The first section 11 forms a cavity with a closed bottom and an open top. The second section 12 is arranged in the cavity and includes a length such that the tool plate 30 is positioned outward from the cavity. The first section 11 is fixedly connected to the robot 100 with the second section 12 being relatively movable to position the associated tool 102 at a variety of positions.

The housing 20 is configured to attach to the robot 100 and may include one or more openings that receive fasteners for the attachment. The housing 20 also includes an inner wall 21 that extends around and bounds a central section 23. The housing 20 also includes a channel 22 that extends around the inner wall 21 that supports a number of coil springs 64. The channel 22 may include a shelf 27. In one embodiment, the shelf 27 is formed by the channel 22 having a larger upper section towards the open end and a smaller lower section towards the closed bottom.

A pivot cap 25 is positioned at the central section 23. The pivot cap 25 includes an indent or opening 26 that is open inward into the central section 23. The pivot cap 25 and housing 20 may be formed as a single piece, or the pivot cap 25 may be a separate piece that is attached by fasteners 99 to the housing 20.

The ball cage 70 is non-movably mounted to the housing 20. The ball cage 70 includes side walls 77 that extend around and form an open interior 74. The ball cage 70 includes a first end 71 that is positioned towards the housing 20 a second end 72 facing in an opposing direction. The first end 71 is positioned in the central section 23 of the base 21. The outer side of the side walls 77 of the ball cage 70 face towards and may contact against the wall 21 of the housing 20. In one embodiment as illustrated in FIG. 5, the first end 71 abuts against the pivot cap 25. As further illustrated in FIG. 5, the ball cage 70 may be secured to the housing 20 with fasteners 99.

The ball cage 70 also includes openings 75 that extend through the side walls 77 in proximity to the second end 72. The openings 75 are spaced around the side walls 77 with the total number of openings 75 varying depending upon the use. In one embodiment, the ball cage 70 includes six openings 75. Each of the openings 75 has the same size and shape.

The second section 12 of the device 10 extends into the ball cage 70 and the housing 20. The portion of the second section 12 positioned in the ball cage 70 and housing 20 includes the ball pivot 40 and the pivot cam 50.

The ball pivot 40 includes an elongated shape with a first end having a spherical head section 41. The spherical head section 41 seats against the pivot cap 25 forming a pivot bearing. The pivot bearing between these elements is maintained during the various movements of the first and second sections 11, 12.

Figure 6:
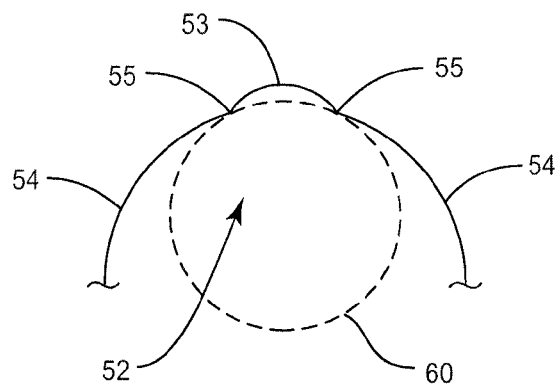
FIG. 6 is a schematic view of a seat in a pivot cam.

The pivot cam 50 includes a first end 57 with a receptacle 43 that receives a second end 42 of the ball pivot 40. The receptacle 43 may extend through a limited portion of the pivot cam 50, or may extend through the entirety as illustrated in FIG. 5. A second end 58 of the pivot cam 50 is configured to connect to the top plate 30. The pivot cam 50 further includes projections 51 that extend radially outward from a radially center section. The projections 51 are evenly spaced around the outer periphery. The projections 51 form seats 52 that are each sized to receive one of the ball members 60. As illustrated in FIGS. 4 and 6, each of the seats 52 includes a back surface 53 and opposing outer surfaces 54. The surfaces 53, 54 include different shapes to form a pair of contact edges 55 that extend along the height of the seat 52. The contact edges 55 contact the ball members 60 when positioned in the seat 52 as illustrated in FIG. 6. The ball member 60 is spaced away from the first surface 53 when contacting against the contact edges 55.

Figure 6A:
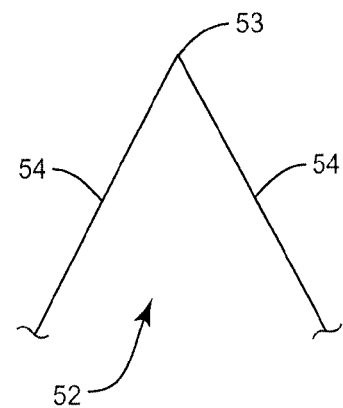
FIG. 6A is a schematic view of a seat in a pivot cam.
Figure 7:
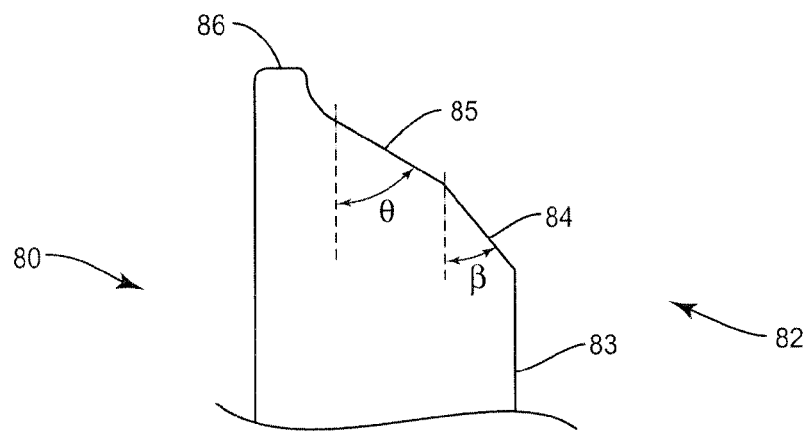
FIG. 7 is a schematic view of an inner side of a piston that includes multiple different sections at different angular positions.

FIG. 6 illustrates the side surfaces 54 having a curved shape. Side surfaces 54 may include various other shapes, including but not limited being substantially straight. In one embodiment as illustrated in FIG. 6A, the seat 52 includes a pair of straight side surfaces 54 with the intersection of the surfaces forming the back surface 53.

The top plate 30 is configured to directly or indirectly connect to the robotic tool 102. The top plate 30 may include an enlarged surface area to facilitate the connection. Openings 31 may extend through the plate 30 to receive fasteners 99 to connect with the pivot cam 50.

The first section 11 may further include a cap plate 90 that extends over the housing 20. The cap plate 90 includes a central opening 91 through which the ball pivot 40 and/or pivot cam 50 extends.

A piston 80 is positioned within the interior of the device 10. The piston 80 includes an annular shape with a central opening 85. The piston 80 includes a bottom 81 that is supported by the springs 64. The piston 80 also includes an inner side 82 that faces inward towards the ball cage 70. The inner side 82 includes a first section 83, second section 84, and third section 85. Each of the sections 83, 84, 85 is relatively flat. The second section 84 is aligned at an angle $\beta$ relative to a centerline of the piston 80, and the third section 85 is aligned at an angle $\theta$ relative to the centerline. Angle $\beta$ may range from between about 20-60°, with a specific embodiment being about 40°. Angle $\theta$ may range from between about 20-80°, with a specific embodiment being about 60°. The piston 80 also includes a lip 86 at a second end opposite from the bottom 81. The lip 86 extends upward beyond the third section and includes an inward face that is substantially parallel with the centerline.

The piston 80 extends around the exterior of the ball cage 70 with the inner side 82 facing towards the side wall 77. The springs 64 exert a force on the piston 80 to urge it away from the housing 20.

Ball members 60 are positioned between the pivot cam 50 and the ball cage 70. Each ball member 60 includes a spherical shape and is sized to be positioned at one of the seats 52. The number of ball members 60 corresponds to the number of seats 52. The ball members 60 are sized to extend through the openings 75 in the ball cage 70. The ball members 60 include a diameter that is smaller than the diameter of the openings 75. The ball members 60 are preventing from falling out of the openings 75 by the geometry of the piston lip 86.

The device 10 is configured to be biased towards the home position illustrated in FIGS. 1, 2, and 5. The springs 64 provide an upward biasing force to the piston 80. This force causes the piston 80 to contact against the ball members 60. The piston 80 is positioned such that the second section 84 of the inner side 82 contacts against the balls 60. The angular orientation $\beta$ of the second section 84 and the upward force of the springs 64 cause the piston 80 to apply a radially inward force to the balls 60 as illustrated by arrows A in FIG. 5. This positions the device 10 in the home position with the second section 12 being aligned along the z axis. This further positions the tool plate 30 in a substantially parallel orientation that is equally spaced away from the cap plate 90.

Figure 8:
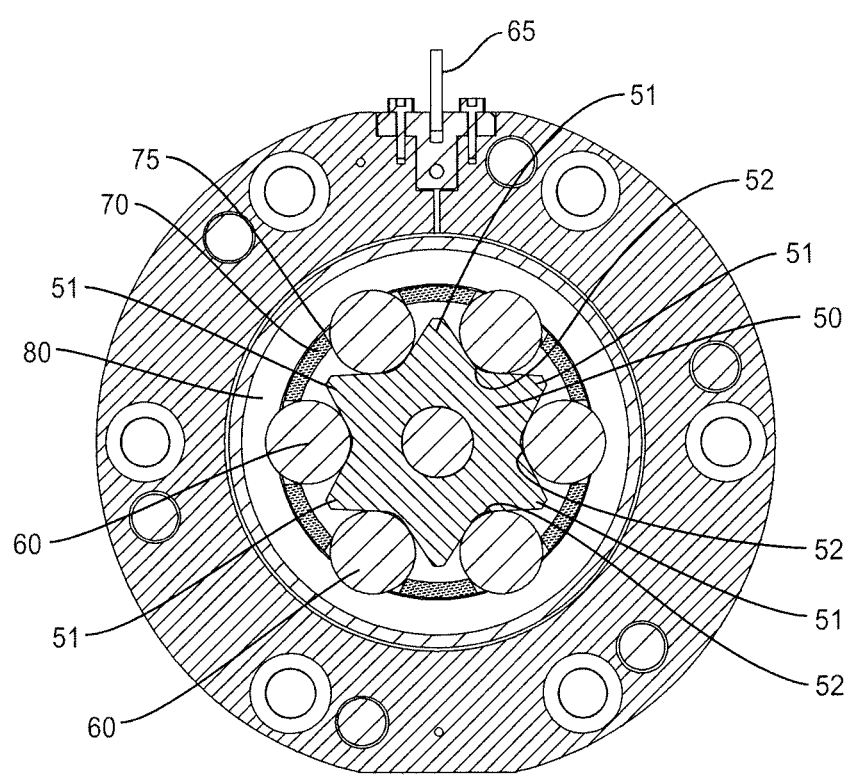
FIG. 8 is a top sectional view of the device of FIG. 2 cut along line VIII-VIII with the device being at the home position.

FIG. 8 illustrates the device 10 in the home position with each of the seats 52 of the pivot cam 50 being rotationally aligned with each of the openings 75 in the ball cage 70. The ball members 60 are centered within each of the seats 52. The diameter of the ball members 60 and the shape of the seats 52 cause the ball members 60 to contact the seats 52 at two positions along the contact edges 55. Further, a portion of the ball members 60 extend outward through the openings 75 and are contacted by the piston 80. This contact by the piston 80 to the ball members 60 provides the force around the periphery of the pivot cam 50 to maintain the orientation at this home position.

Figure 9:
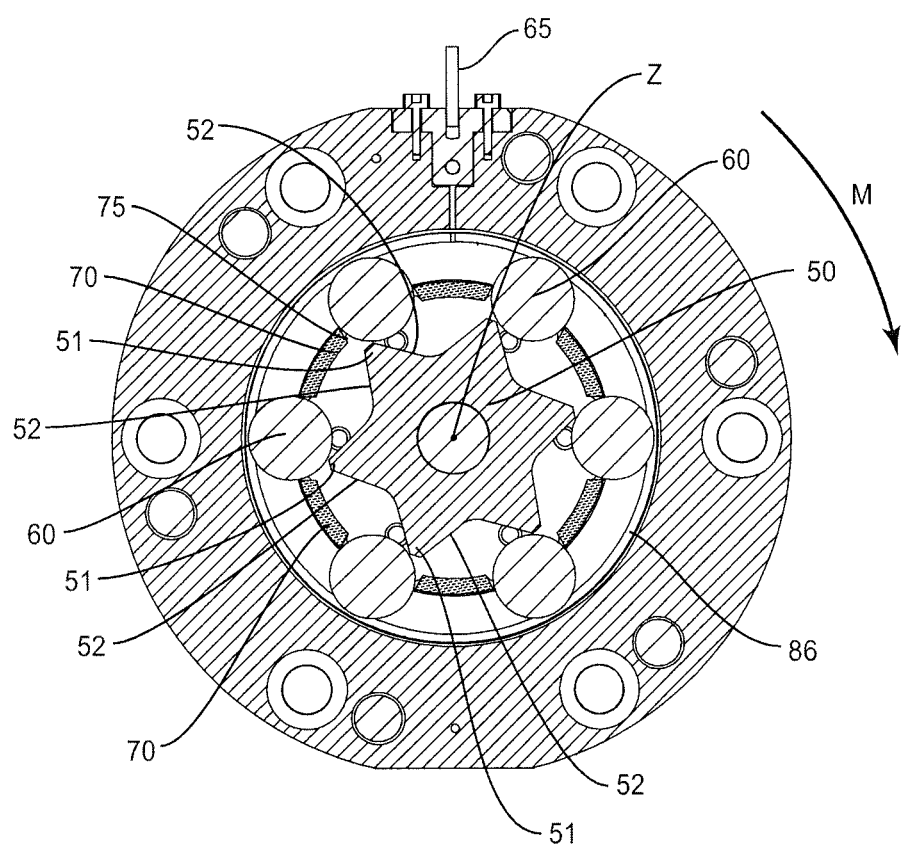
FIG. 9 is a top sectional view of the device of FIG. 8 rotated about the z-axis.

When a load is applied on the tool plate 30, the second section 12 is movably relative to the first section 11 to comply rotationally about one or more of the x, y, and z axes. FIG. 9 illustrates an embodiment with the first section 12 rotated about the z axis in the direction of arrow M. The force applied to the tool plate 30 overcomes the force exerted by the springs 64 thus allow for movement of the second section 12.

The applied force causes the pivot cam 50 to rotate in the direction of arrow M. The pivot cam 50 moves relative to the ball members 60 and the ball cage 70. This movement causes the ball members 60 to be moved out of alignment in the seats 52 and against an outer portion of the section 54. This causes the ball members 60 to move radially outward away from the z axis and further into the openings 75. The outward movement of the ball members 60 applies a downward force on the piston 80 that overcomes the bias of the springs 64. This further causes the ball members 60 to move into contact with the third section 85 of the inner side 82 of the piston 80. During rotation about the z axis, the head 41 of the ball pivot 40 remains in contact with the pivot cap 25.

The extent of rotation about the z axis is limited as the ball members 60 move against the lip 86 of the piston 80. This prevents further radial movement of the ball members 60 and thus prevents further rotation of the pivot cam 50.

The extent of rotation may also be limited by the piston 80 reaching a maximum downward position. As the piston 80 moves downward in the channel 22, the piston 80 contacts against the shelf 27 (FIG. 5). This contact prevents further downward movement of the piston 80 along the z axis. This in turn prevents further radial movement of the ball members 60 outward away from the z axis.

Once the force is removed from the second section 12, the force of the springs 64 will return the device 10 to the home position.

Figure 10:
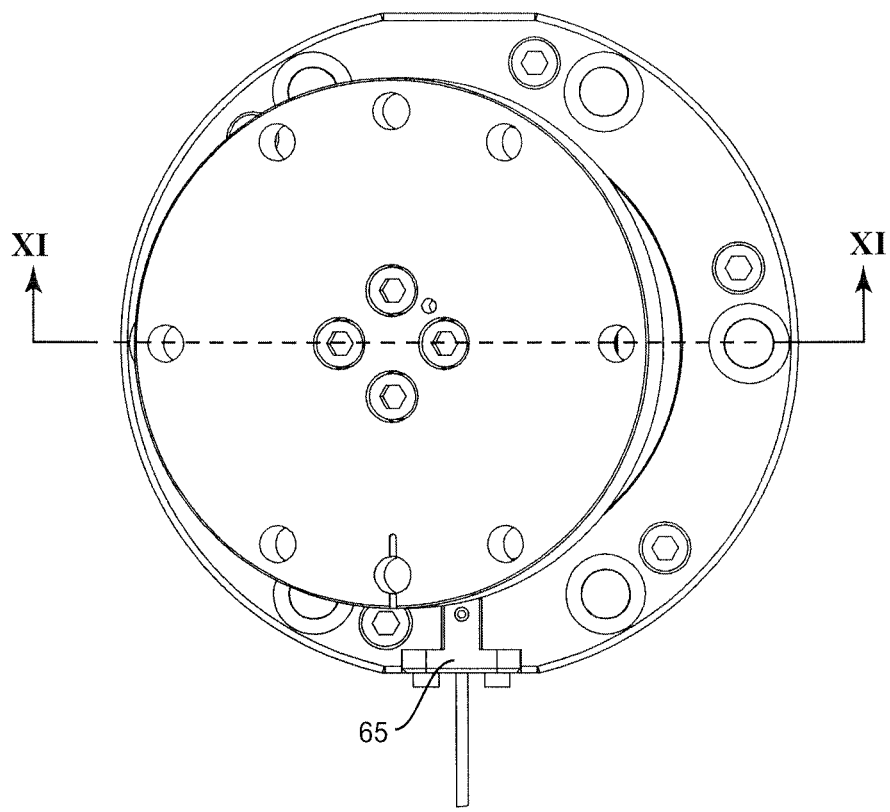
FIG. 10 is a top view of a device rotated about one or more axes.
Figure 11:
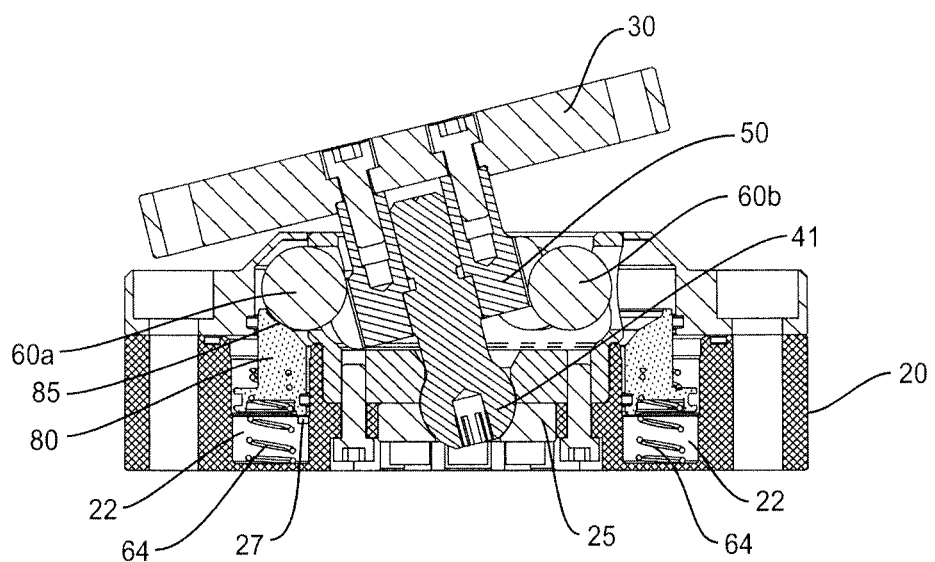
FIG. 11 is a side sectional view of the device of FIG. 10 cut along line XI-XI.

FIGS. 10 and 11 illustrate the device 10 rotated about one or both of the x and y axes. As illustrated, the second section 12 has pivoted about the pivot bearing formed between head 41 and the pivot cap 25. This movement causes the pivot cam 50 to apply an outwardly radial force to the ball members 60 in the direction of the tilt (illustrated as ball member 60a in FIG. 11). This force causes the ball member 60a to move radially outward away from axis z and further into its opening 75 in the ball cage 70. The radially outward movement causes the ball member 60a to move into contact with the third section 85 of the piston 80. This causes the ball member 60a to apply a downward force to the piston 80 that overcomes the force of the springs 64 and moves the piston 80 downward along axis z. The extent of movement is limited by a shelf 27 in the channel 22 that is contacted by the bottom 81 of the piston 80 and/or the ball member 60a contacting against the lip 86 of the piston 80. This prevents further downward movement of the piston 80 into the channel 22, further radial movement of the ball member 60a, and thus prevents further pivoting movement of the second section 12.

The ball members 60 positioned away from the direction of the tilt (e.g., ball member 60b in FIG. 11) may be free to move within the area formed between the seat 52 and the piston 80. This area increases when the second section 12 pivots away from the ball member 60b. However, the size of the ball member 60b is large enough to prevent the ball member 60b from escaping from this area.

Once the force is removed, the biasing force applied by the springs 64 causes the second section 12 to return to the home position.

In the various embodiments, the ball members 60 remain positioned at the same location relative to the z axis during movement of the second section 12. The ball members 60 may rotate due to the contact with the piston 80 and/or the pivot cam 50.

In the various angular orientations of the second section 12 relative to the first section 11, a pivot bearing is maintained between the head 41 of the ball pivot 40 and the pivot cap 25. The head 41 remains in contact with the pivot cap 25.

The device 10 is able to comply simultaneously about each of the multiple axes. During movement about multiple axes, the extent of movement in one or more of the axes may be reduced to an amount less than if the device 10 were moving about just a single axis.

In one embodiment, the force necessary to rotate the tool plate 30 about each of the x, y, and z axes is substantially the same. This is the force necessary to overcome the force applied to the pivot cam 50 through the ball members 60, piston 80, and springs 64.

In one embodiment as described above, springs 64 apply and upward force on the piston 80. In another embodiment, one or more chambers are formed between the base 21 and the piston 80. A fluid, such as air or a hydraulic fluid, is inserted into the one or more chambers to apply the force to the piston 80 instead of the springs 64. One or more ports may extend through an outer wall of the base 21 and be in communication with the one or more chambers to deliver the fluid.

Figure 12:
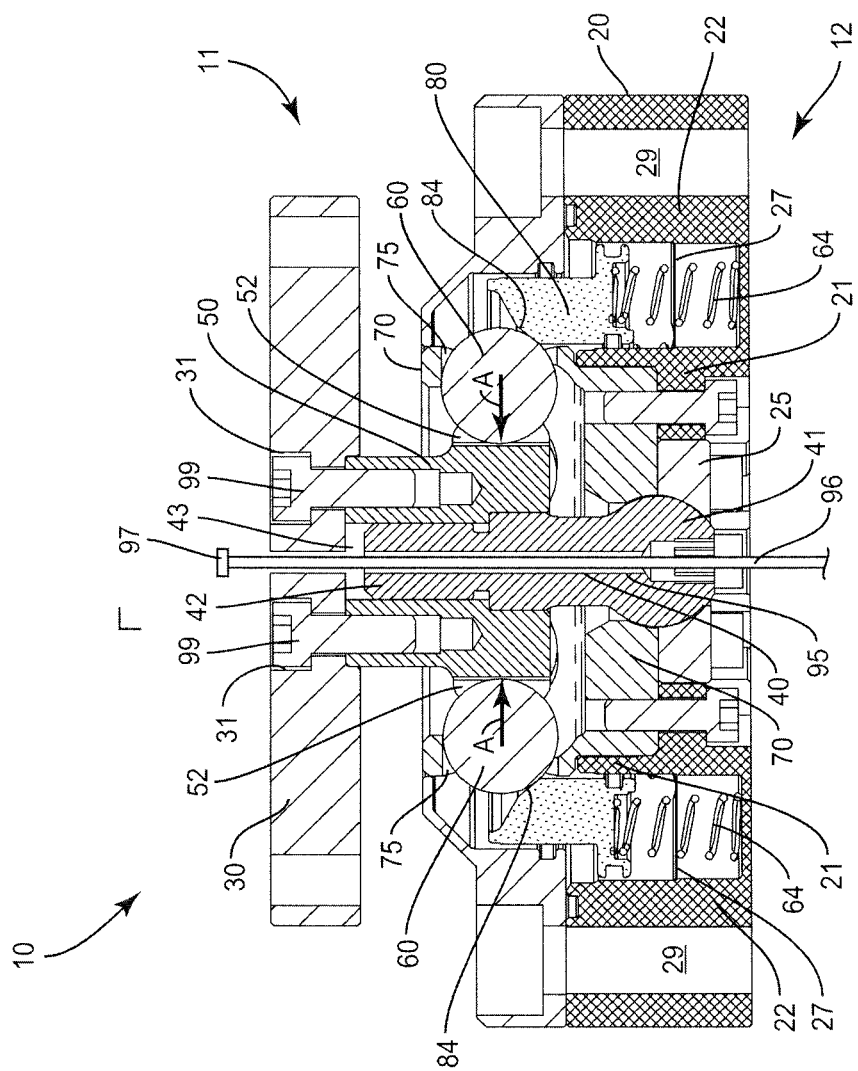
FIG. 12 is a side sectional view of a device with an interior channel and a cable.

The pivot bearing formed between the head 41 of the ball pivot 40 and the pivot cap 25 is maintained during the various movements of the device 10. In one embodiment as illustrated in FIG. 12, a channel 95 extends through a center section of the device 10 including the pivot bearing. An elongated member 96 may extend through the channel 95 to provide for various connections between the robot 100 and the robotic tool 102. Examples of the different types of cables 96 include but are not limited to electrical power, signaling and communication, utility line, and hydraulic fluid. A fitting 97 may be positioned at the end of the cable 96 at the tool plate 30 to facilitate connection with the robotic tool 102.

The various elements may be made from a variety of materials, including various metals. In one embodiment, the elements that come into contact with the ball members 60 are constructed from hardened steel. This construction provides for high repeatability of positioning the device in the centered, home position and provides for the device 10 to withstand a high number of cycles.

In one embodiment, the device 10 further includes a sensor 65 to detect the orientation of the plate 30 relative to the housing 20. The sensor 65 may be mounted in the base 21 and/or cap plate 90.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A compensation device adapted to be interposed between a robot and a robotic tool, the compensation device comprising:
    a first section configured to be mounted to the robot and comprising a cavity formed between a bottom wall and a side wall and including an open top, the cavity extending along a first axis;
    a second section configured to be operatively connected to the robotic tool, the second section comprising:
        an elongated member with a first end and a second end, the first end positioned in the cavity and in contact with and forming a pivot bearing with the first section with the second end extending outward beyond the top of the cavity;
        a tool plate spaced along the elongated member and away from the first end;
        a radial member mounted to and extending radially outward from the elongated member and positioned axially along the elongated member between the first end and the tool plate and being located within the cavity, the radial member including a plurality of seats positioned around the periphery and facing radially outward towards the side wall of the cavity;
    a piston positioned in the first section and being axially movable along the first axis, the piston including a contact surface that faces radially inward towards the seats; and
    a plurality of ball members positioned relative to the first axis radially between the radial member and the piston with one of the plurality of ball members positioned in each of the seats;
    the piston being biased away from the bottom wall and towards the tool plate to contact the ball members and apply a radial force around the elongated member to bias the elongated member to be aligned along the first axis.

2. The device of claim 1, wherein the second section is movable relative to the first section to comply rotationally about the first axis, and about second and third axes with the axes being orthogonal.

3. The device of claim 1, further comprising a plurality of springs positioned between the first section and the piston to bias the piston away from the bottom wall and towards the tool plate.

4. The device of claim 3, wherein the piston includes an annular shape and is positioned along an outer periphery of the side wall of the cavity.

5. The device of claim 4, wherein the contact surface of the piston is positioned at an acute angle with the first axis.

6. The device of claim 1, wherein pivoting movement of the second section away from the first axis drives at least one of the ball members radially outward from the first axis and forces the piston downward within the first section.

7. The device of claim 6, wherein the piston includes a second contact surface adjacent to the contact surface that is positioned at a second acute angle with the first axis that is greater than the acute angle, at least one of the ball members contacting against the second contact surface during movement of the second section away from the first axis.

8. The device of claim 1, wherein the first end of the elongated member includes a spherical head that remains in contact with the bottom support during movement of the second section relative to the first section.

9. The device of claim 1, wherein the side wall of the cavity includes a plurality of openings that are spaced apart with each of the openings receiving one of the plurality of ball members with the ball members extending through the openings when the second section is aligned along the first axis.

10. A compensation device adapted to be interposed between a robot and a robotic tool, the compensation device comprising:
    a first section comprising a cavity formed by a bottom wall and a side wall;
    a second section movably positioned in the cavity and including a first end with a head pivotally positioned against the first section, a tool plate spaced away from the head, and an intermediate member positioned between the head and the tool plate, the head and the intermediate member positioned in the cavity and the tool plate positioned outward from the cavity;
    a piston positioned in the first section and being movable axially along an axis of the cavity;
    a plurality of ball members positioned between the piston and the intermediate member, the plurality of ball members being radially movable relative to the axis of the cavity;
    the piston being biased away from the bottom wall of the first section to contact the plurality of ball members and apply a radial force through the plurality of ball members around the intermediate member to position the second section at a home position;
    the second section being pivotable away from the home position upon the application of an external force to the tool plate with the ball members being configured to move radially outward away from the axis of the cavity and the piston configured to move along the axis of the cavity and the head of the second section being configured to remain in contact with the first section.

11. The device of claim 10, wherein the second section is pivotable about the axis of the cavity with the first and second members being configured for the plurality of ball members to remain at the same axial position along the cavity.

12. The device of claim 10, further comprising a channel that extends through a pivot bearing formed between the first member and the head of the second member.

13. The device of claim 10, wherein the intermediate member includes a plurality of radially open seats each sized to receive one of the plurality of ball members, each of the seats including a back wall with a first curvature and opposing side walls with a second curvature such that the ball members contact the seats at the intersections of the back wall and the side walls at the home position.

14. The device of claim 10, wherein the side wall of the cavity includes a plurality of openings that are spaced apart with each of the openings receiving one of the plurality of ball members, the openings being sized such that a portion of the ball members extend through the openings in the home position.

15. The device of claim 10, wherein the piston includes an annular shape and extends radially around an exterior of the side wall of the cavity.

16. The device of claim 10, further comprising a sensor mounted to the first section to detect when the second section is at the home position.

17. A compensation device adapted to be interposed between a robot and a robotic tool, the compensation device comprising:
   a housing with a first side and an opposing second side, the housing including a central axis that extends through the first and second sides;
   a cage that extends from the housing and is non-movable relative to the housing, the cage including a receptacle that is aligned with the central axis;
   a cam member movably mounted to the base, the cam member comprising:
      a plate positioned at the first side of the base and outward beyond the cage;
      a pivot cam positioned within the cage and having a central section with a plurality of seats that open radially outward towards the cage;
      a head positioned on an opposing side of the pivot cam from the plate, the head having a spherical section that contacts against the housing;
   a plurality of ball members positioned axially between the plate and the pivot cam with one of the plurality of ball members positioned within each of the seats;
   a piston with an annular shape and a central opening, the piston extends around each of the ball members and is movable axially along the central axis and being biased into contact with the ball members to force the ball members radially inward against the pivot cam;
   the cam member being biased toward a first position aligned along the central axis by the radial force applied around the pivot cam;
   the cam member pivotable relative to the housing and the cage about the central axis;
   the cam member pivotable relative to the housing and the cage to move the plate away from the central axis with the head remaining in contact with the housing during the pivoting movement.

18. The device of claim 17, wherein the piston extends around an exterior of the cage.

19. The device of claim 17, further comprising a channel that extends through a pivot bearing formed between the head and the housing.

* * * * *